(12) United States Patent
Tomicki et al.

(10) Patent No.: US 8,171,038 B2
(45) Date of Patent: May 1, 2012

(54) SYSTEM AND METHOD FOR MANAGING LEGISLATIVE INFORMATION

(75) Inventors: Lukasz R. Tomicki, South Orange, FL (US); Travis Brown, Columbia, MO (US); Larry J. Stendebach, Columbia, MO (US)

(73) Assignee: LobbyAssist, LLC, St. Louis, MO (US)

( * ) Notice: Subject to any disclaimer, the term of this patent is extended or adjusted under 35 U.S.C. 154(b) by 550 days.

(21) Appl. No.: 12/020,397

(22) Filed: Jan. 25, 2008

(65) Prior Publication Data

US 2009/0193056 A1    Jul. 30, 2009

(51) Int. Cl.
*G06F 17/30* (2006.01)
(52) U.S. Cl. ......... 707/758; 707/706; 707/713; 707/722
(58) Field of Classification Search .................. 707/705, 707/706, 707, 713, 722, 758; 705/1; 709/203
See application file for complete search history.

(56) References Cited

U.S. PATENT DOCUMENTS

| | | | | |
|---|---|---|---|---|
| 5,414,809 | A * | 5/1995 | Hogan et al. | 715/765 |
| 6,070,160 | A * | 5/2000 | Geary | 707/723 |
| 6,363,377 | B1 * | 3/2002 | Kravets et al. | 707/713 |
| 6,421,675 | B1 * | 7/2002 | Ryan et al. | 707/706 |
| 6,898,618 | B1 * | 5/2005 | Slaughter et al. | 709/203 |
| 7,130,848 | B2 * | 10/2006 | Oosta | 707/706 |
| 7,231,205 | B2 * | 6/2007 | Guyot et al. | 715/234 |
| 2003/0058277 | A1 * | 3/2003 | Bowman-Amuah | 345/765 |
| 2006/0004719 | A1 * | 1/2006 | Lawrence et al. | 707/713 |
| 2007/0112762 | A1 * | 5/2007 | Brubaker | 707/723 |
| 2008/0033929 | A1 * | 2/2008 | Al-Kofahi et al. | 707/723 |

* cited by examiner

*Primary Examiner* — Shahid Alam
(74) *Attorney, Agent, or Firm* — Lathrop & Gage LLP (57) ABSTRACT

A method for managing legislative information. in operation, legislative information, including text comprising legislative bills, is collected via an electronic search of at least one website. The text of the bills is then parsed into predefined categories. The text thus parsed is stored in a database. A search, using one of the predefined categories as search criteria, is then performed to select a subset of the bills meeting the search criteria. Information, related to the subset of the bills, is then transmitted to a requesting entity via an electronic communication.

3 Claims, 10 Drawing Sheets

SYSTEM AND METHOD FOR MANAGING LEGISLATIVE INFORMATION

BACKGROUND

Previously, legislators, lobbyists, and political interest groups have been limited in how they obtained, filtered, and managed legislation of interest to them. Monitoring and manipulating legislative information was restricted to those who maintained physical possession, or received frequent facsimile copies of legislative bills and proposed amendments to the bills. Recently, various government websites have begun offering basic, time-delayed reporting information based on legislative activity. However, no mechanism has previously existed which leverages the information accessible through these websites into a system that functions as a useful, real-time, information management mechanism.

DETAILED DESCRIPTION

The present system comprises a legislative management system that parses data from various sources of public information and displays relevant search results based on system user requests. In an exemplary embodiment, the system uses tracking mechanisms tailored specifically for state and Federal legislation. The system provides users with the ability to find legislative information, track and monitor specific legislative interests, and report on related legislative affairs.

Figure 1A:
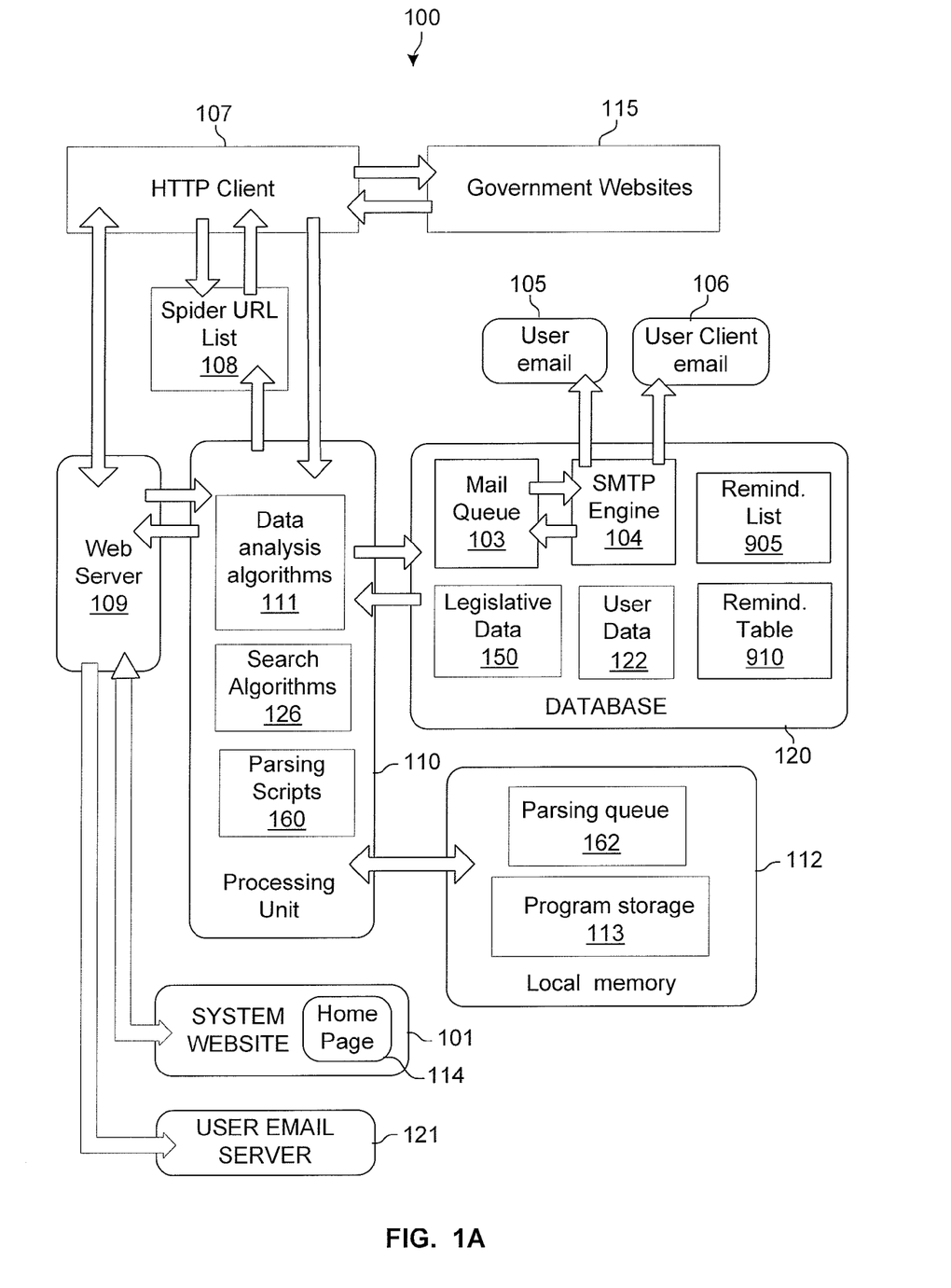
FIG. 1A is an exemplary high-level diagram of the present system.

FIG. 1A is an exemplary high-level diagram illustrating certain components of the present system. As shown in FIG. 1A, the present system includes a processing unit 110 comprising one or more processors and associated local memory 112 and interfacing hardware coupled to a database 102 and to a web server 109. Local memory 112 provides storage space 113 for all programs, subroutines, scripts, as well as parsing queue 162, and also serves as temporary cache and other temporary data storage.

Figure 2:
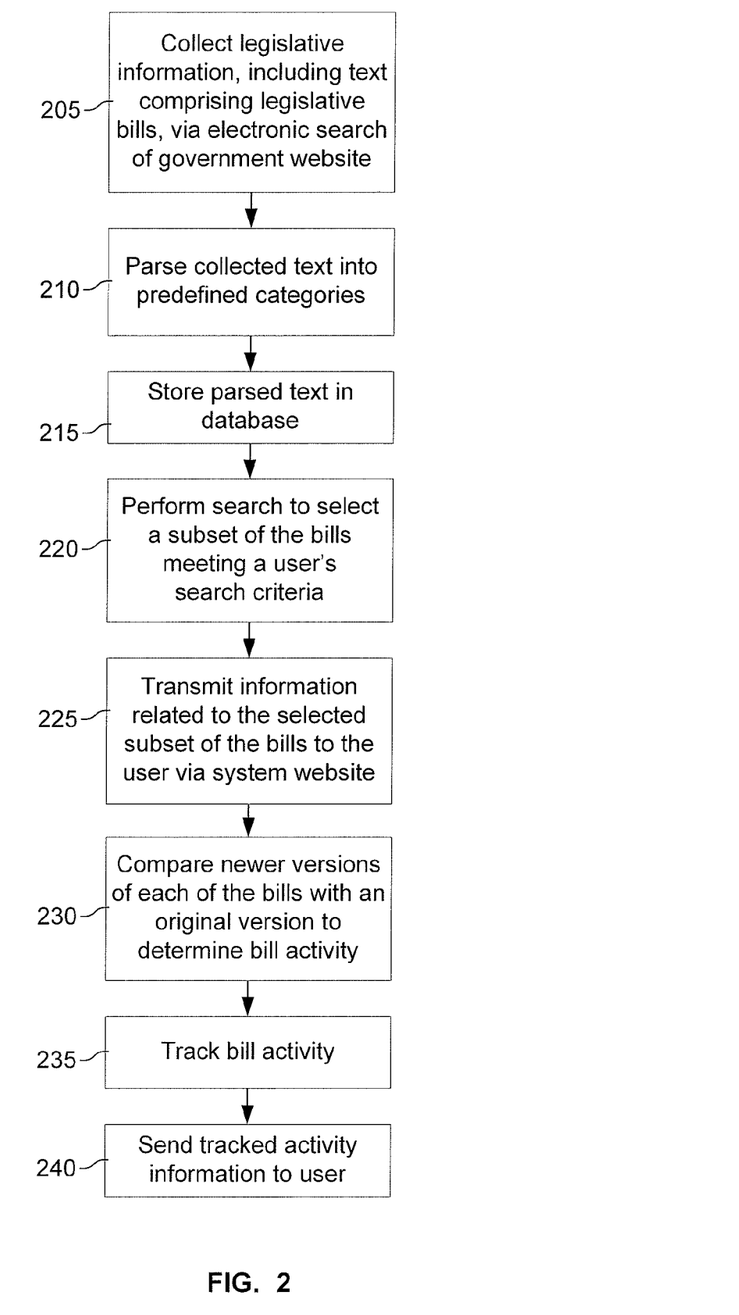
FIG. 2 is a flowchart showing an exemplary set of steps performed in managing legislative information in accordance with the present system.

One function of web server 109 is to drive an HTTP web client 107 that makes requests to HTTP transaction servers on external websites 115. The HTTP client 107 may be integrated with the web server 109 (as shown in FIG. 2). The present HTTP client 107 provides an information collection function, and comprises a search engine that makes HTTP client requests from Internet web servers to retrieve legislative information from government websites 115. The HTP client 107 provides some processing of the information for subsequent use by the present system, and handles sessions, cookies, GET/POST, caching, etc. Web server 109 also controls communication with the system website 101 (via a user's web browser), and additionally manages the task of sending email to a user's email system 121.

Figure 1B:
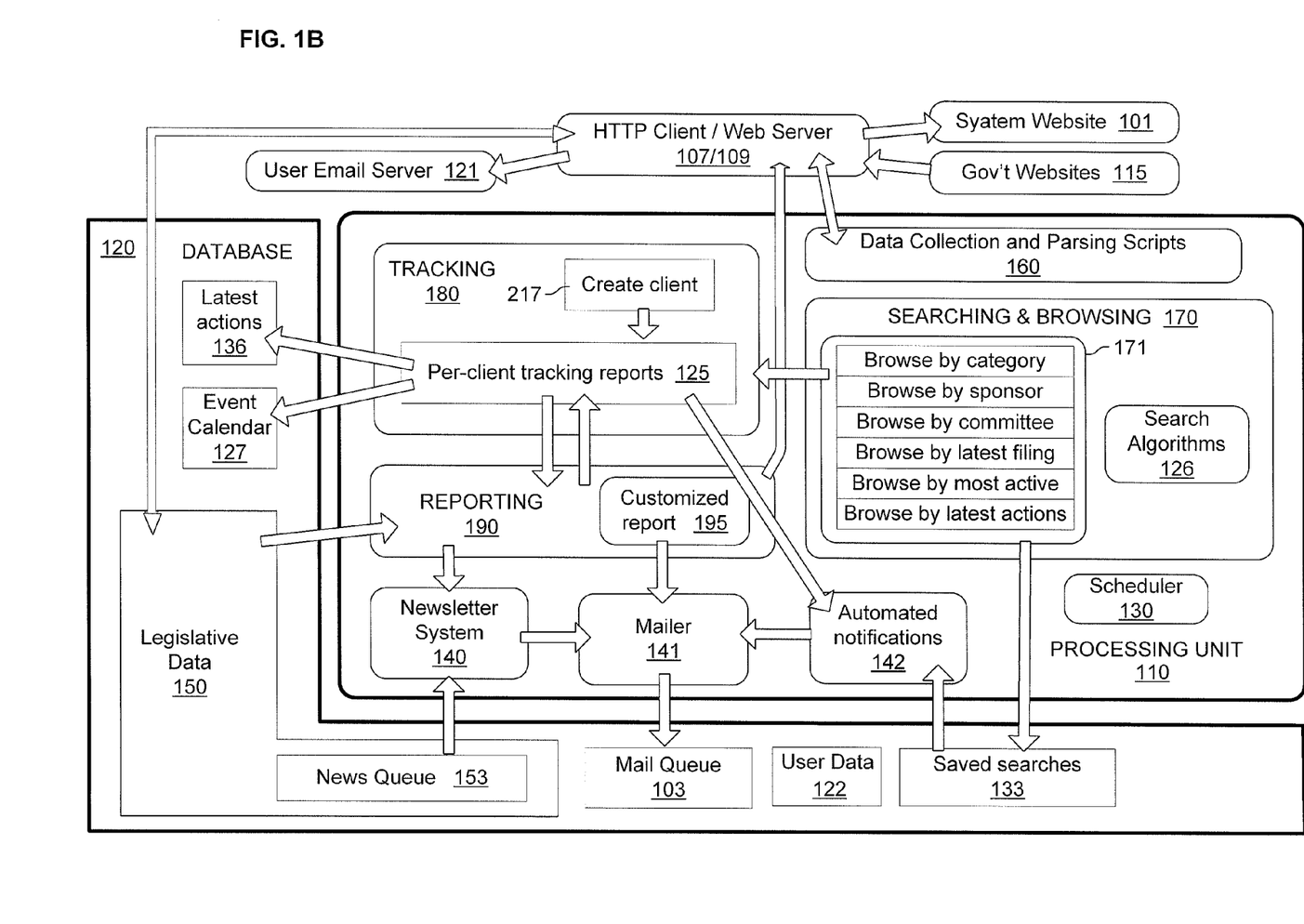
FIG. 1B is a diagram showing exemplary data flow through the system.

FIG. 1B is a diagram showing exemplary data flow through the system 100. As shown in FIG. 1B, the system website, and client-related functions including email, and legislative search and reporting functions are driven by various processes in processing unit 110. More specifically, system functions may be broken down into primary areas including (1) legislative bill (hereinafter simply 'bill') data collection and parsing 160, (2) searching and browsing 170, (3) bill tracking 180, and (4) client reporting 190.

System processes are normally scheduled via 'cron' schedulers 130. These processes are typically scripts. In an exemplary embodiment, scripts used by the present system include parsing scripts, reporting scripts for tracking problems and compiling reports, mailer scripts, and notification update scripts. In operation, a first script writes information to the database 120, which information then is used by another script, etc. Inter-process communication is employed by the present system 100 only when database access requires interactive communication between two processes.

FIG. 2 is a flowchart showing an exemplary set of steps performed in managing legislative information in accordance with the present system 100. As shown in FIG. 2, at step 205, legislative information, including text comprising legislative bills, is collected via an electronic search of a government website. At step 210, the text thus collected is parsed into predefined categories. At step 215, the text thus parsed is stored in database 102 as parsed legislative data text 150. A search of the parsed legislative data text 150, using one of the predefined categories as search criteria, is then performed in response to a request from a requesting entity, i.e., a user of system website 101, at step 220, to select a subset of the bills meeting the user's search criteria. The search is implemented by a search algorithm 126. At step 225, information related to the selected subset of the bills is then transmitted to the user via system website 101.

At step 230, subsequent (newer) versions of the parsed text of each of the bills are compared with an original version of the parsed text of each of the bills to determine activity of each of the bills. Activity of the bills is tracked, at step 235, where the tracked bill-related activities may include movement between house and senate, amendments proposed, amendments effected, and committee actions. At step 240, information related to the tracked activity is transmitted to the system user via system website 101 or via an email message sent to the user through the user's email server 121.

The steps shown in FIG. 2 are explained in detail below.

Data Collection and Parsing

The present system uses a number of scripts 160 (independently executable programs) tailored for extracting information from various government websites 115. These websites include both state and federal government sites. For example, the websites used by the present system as a source of legislative information for the state of Missouri include sites for which the URLs are listed in Table 1, below:

TABLE 1 http://www.senate.mo.gov/08info/jrnlist/journals.aspx
http://www.house.mo.gov/billtracking/bills081/jrn/journal.htm
http://www.house.mo.gov/billtracking/bills081/dlycal.htm
http://www.senate.mo.gov/08info/pdf-cal/cal.htm
http://www.senate.state.mo.us/08info/hrings.htm
http://www.house.state.mo.us/billtracking/bills081/hearings.htm
http://www.senate.mo.gov/08info/bts_web/billList.aspx?sessiontype=R
http://www.house.mo.gov/billtracking/bills081/billist.htm
http://www.house.mo.gov/billtracking/bills081/sbjndx/sbjlst.htm In an exemplary embodiment, this information comprises legislative data, including the text of legislative bills that are on the floor of the House or Senate of certain state legislatures, as well as the bills in the U.S. Senate and House of Representatives. These bills include those that are presently, or which have been, filed, 'read', 'in committee', voted on, and recently withdrawn. Legislative text of interest is extracted from the websites and parsed into predefined categories, such as text indicating the house or senate member, house/senate committee, house/senate bill, legislative session, etc.

In an exemplary embodiment, legislative data is collected using scripts 160 including shell scripts (/bin/bash) and PHP scripts, which are run using a 'cron' scheduler 130 (a monitor which runs to cause specific tasks to be executed periodically), using well-known process control methods such as lock files and PID numbers, to prevent two scripts from running at the same time.

All scripts 160 share a library of functions (stored in storage area 113) that handle the processing, indexing, and caching, etc., of system data. Scripts 160 function as 'web crawlers' and have a 'parsing queue 162'. A 'web crawler' (also known as a web spider) is a program or automated script which browses the Internet (or selected parts thereof) in a methodical, automated manner.

Figure 3:
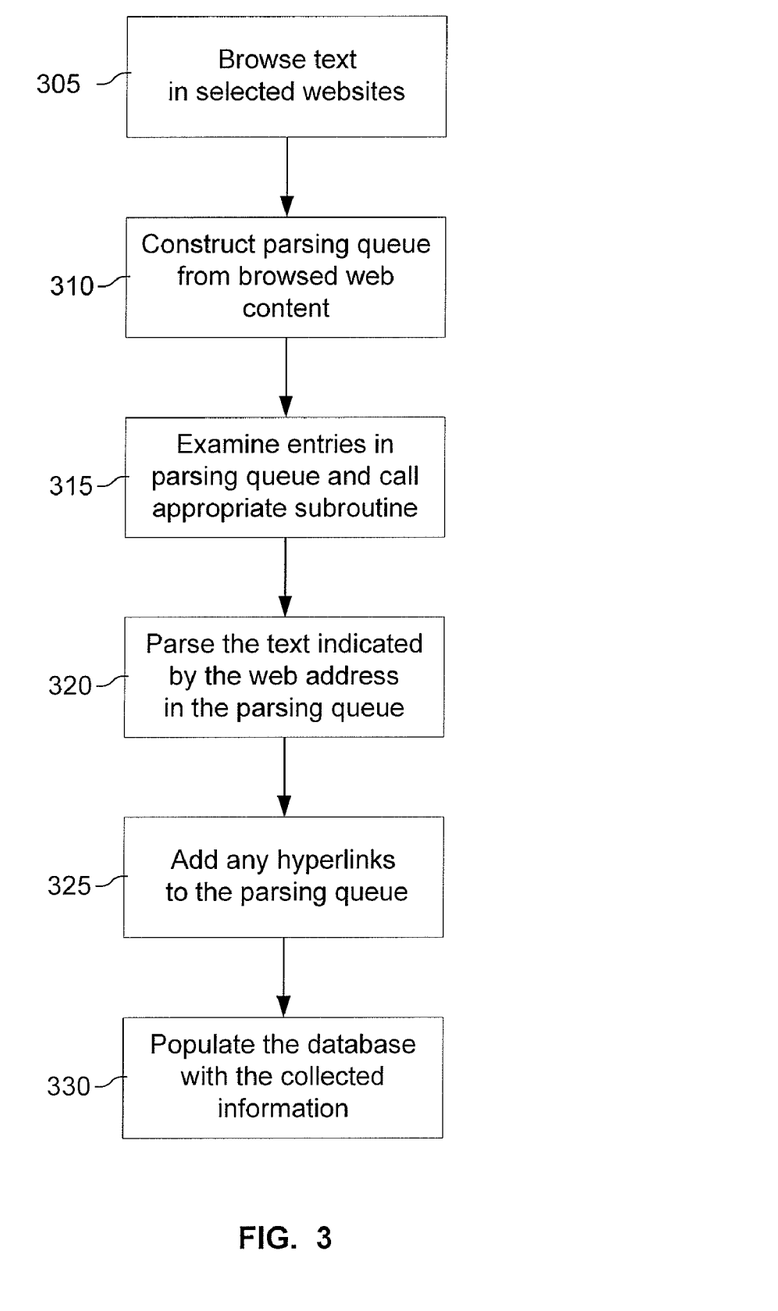
FIG. 3 is a flowchart showing an exemplary set of steps performed in collecting and parsing data.

FIG. 3 is a flowchart showing an exemplary set of steps performed in collecting and parsing data from selected government websites. As shown in FIG. 3, initially, at step 305, a script browses through all of the text in a predetermined set of government websites. At step 310, a parsing queue 162 is constructed during the browsing operation, from the browsed web content. The page layout and structure of each web page is parsed such that only links that appear on a web page in predefined locations are added to the parsing queue 162. The parsing queue 162 consists of a web address and a token describing the data type of the data being browsed. An example of a parsing queue is shown further below.

At step 315, a parsing script then examines each of the entries in the parsing queue 162, and, for each queue entry, calls the appropriate parsing subroutine, which is selected according to the data type indicated in the queue. Each entry in the parsing queue 162 includes an address/token pair, which comprises a URL and a number ('token') that describes which subroutine (or function) handles the data at the address specified by that URL. Each token comprises a DEFINE statement that includes a unique integer for a given token type. The token itself does not indicate the data type; rather, the token describes which subroutine will handle the URL in the parsing queue. Based on the value of a particular token in the parsing queue, the appropriate parsing subroutine retrieves the data from the location indicated by the URL (the address part of the address/token pair) using the HTTP client 107 and determines whether the retrieved data matches the expected format.

At step 320, the parsing subroutine then parses the text indicated by the web address in the parsing queue, e.g., HTML code, PDF files, etc. The parsing queue allows text to be parsed according to the predefined categories noted above. When a parsing subroutine encounters a hyperlink, the hyperlink is added to the parsing queue, at step 325. Not all links are parsed in, as a result of advance knowledge of the basic format of the web pages to be scanned/collected. Although each token describes one URL, parsing subroutines frequently retrieve many pages at a time. For example, there may be a URL for a house bill in the parsing queue. A parsing function for parsing house bills is called with the URL of the main web page containing the bill data. The parsing function may retrieve a number of pages in order to parse a single bill. The parsing subroutine retrieves a page, and from it, retrieves, for example, the URL for the full text of the bill, the action details for the bill and any amendments for the bill.

The parsing script then populates the database with the information thus collected for the predefined categories, at step 330. The parsing queue 162 is examined from start to finish. The parsing script runs sufficiently often so that the parsing queue 162 is in effect re-examined frequently. An example of a parsing queue is set forth below:

```
define(PARSE_HOUSE_MEMBER, 0);
define(PARSE_HOUSE_COMMITTEE, 1);
define(PARSE_HOUSE_BILL, 2);
define(PARSE_SESSION, 3);
define(PARSE_CURRENT_HOUSE_BILL_LIST, 4);
...
define(PARSE_HOUSE_MEMBER_LIST, 28);
define(PARSE_BILL_LIST, 29);
```

A parsing subroutine, such as the one shown below, examines the parsing queue:

```
while ($parse_position < count($parse_queue)) {
    switch ($parse_type[$parse_position]) {
        case PARSE_BILL_LIST:
    parse_bill_list($parse_queue[$parse_position]);
            break;
        case PARSE_HOUSE_MEMBER_LIST:
    parse_member_list($parse_queue[$parse_position], "house");
            break;
        case PARSE_HOUSE_MEMBER:
    parse_member($parse_queue[$parse_position], "house");
            break;
    }
    ++$parse_position;
}
```

The parsing subroutine also executes code, such as that below, to determine which URLs should be parsed:

```
if ($bill_url && strpos($bill_url, $parse_base) === false)
    $bill_url = $parse_base . $bill_url;
    add_url($bill_url, PARSE_BILL, true);
```

Searching and Browsing

Figure 4:
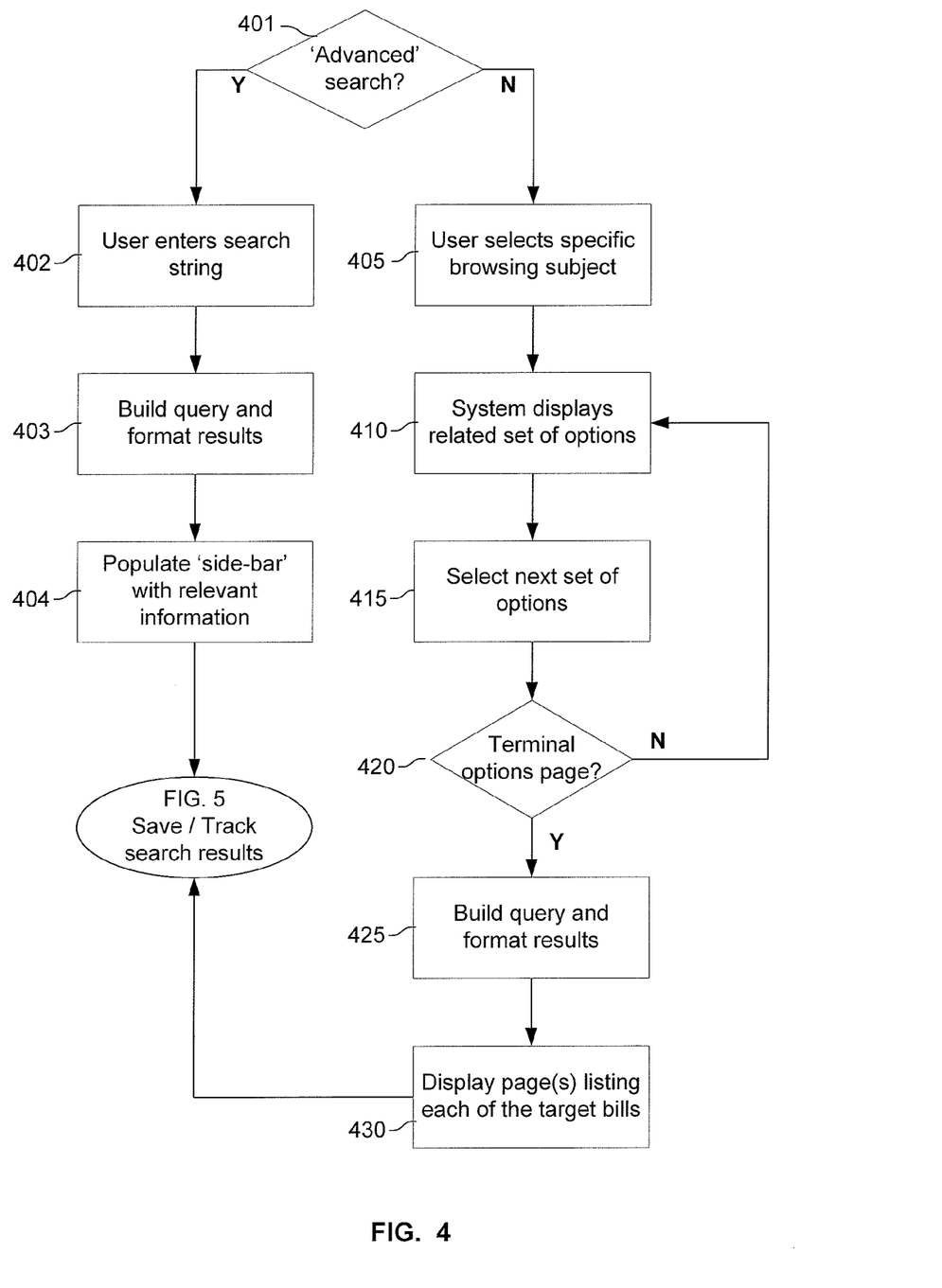
FIG. 4 is a flowchart showing an exemplary set of steps executed in performing a search.

The present system 100 provides the capability for users to browse for legislative bills of interest, and alternatively, to search for bills by using an 'advanced search' option, which allows a user to narrow search results to increase their relevance. FIG. 4 is a flowchart showing an exemplary set of steps executed in browsing for legislative bills. Browsing and search requests are processed by search algorithms 126. In an exemplary embodiment, as indicated in FIG. 4, at step 405, a user first clicks on (selects) a specific browsing subject area under a "browse bills" icon on the home page 114 of system website 101. Alternatively, the user may click on the "browse bills" icon, and then click on the subject area displayed on a separate web page which is next displayed. These subject areas (shown in FIG. 2 as list 171) include "browse by category", "browse by sponsor", "browse by committee", "browse by latest filing", "browse by most active", and "browse by latest actions".

'Browse by latest actions' displays a list of relevant bills stored in area 136 of the database 120 sorted by the date created, starting from the most recent bill. 'Browse by most active' examines the entire pool of relevant bills and displays a list of bills sorted according to the movement ranking algorithm described below.

Once a particular subject area has been selected, the system 100 displays a related set of options on a series of subsequently displayed pages, at step 410. For example, if "browse by sponsor" is selected, a page is displayed which lists options of "house of representatives" and "senate". At step 415, one of the options is selected. At step 420, if the next page to be displayed is not the 'terminal options' page (i.e., the last page of options prior to the page containing the desired target set of bills), a page is then displayed which lists the next set of available options (step 410). This process of selecting and displaying options is repeated, as indicated by loop 420/410/415, until a page containing a target set of bills is to be displayed. In the present example, the user next selects the desired legislative member, (step 415), which is the 'terminal' page.

At step 425, the system then builds a dynamic query and formats the results, which in this case are all of the bills sponsored by the selected legislative member. At step 430, the results are returned to the user, wherein (in the present example) the system displays one or more pages listing each of the bills sponsored by that particular legislator, including full-text of each bill. The user may click on a particular bill ID number (e.g. HB1, SB2) to view information pertaining to the bill in question. At this point, a user may also save the text of one or more bills to a 'saved searches' section 133 of the database 120. This allows a virtual record of all bill versions to be created.

As an alternative to browsing for a bill, an 'advanced search' may also be performed, wherein a user enters a search string to conduct a parameter-related search, at step 402. The system receives user input (e.g., 'show all bills sponsored by member with member_id=3798'). Then a query (in the present example, "select*from bills where sponsor_id=3798"), is executed at step 403 and the results are formatted and sent to the user's browser, at step 403. In an exemplary embodiment, user requests and replies are made using XHTTP (AJAX) requests. Queries may additionally include table joins, sorting, full text search, etc. System users may also browse for specific phrases in the entire bill text. At step 435, in one embodiment, 'side-bar' results are populated, on the system website home page 114, for state/federal statutes, news, 'blogs', and online video sites related to the user's query.

Clients and Tracking Lists

Figure 5:
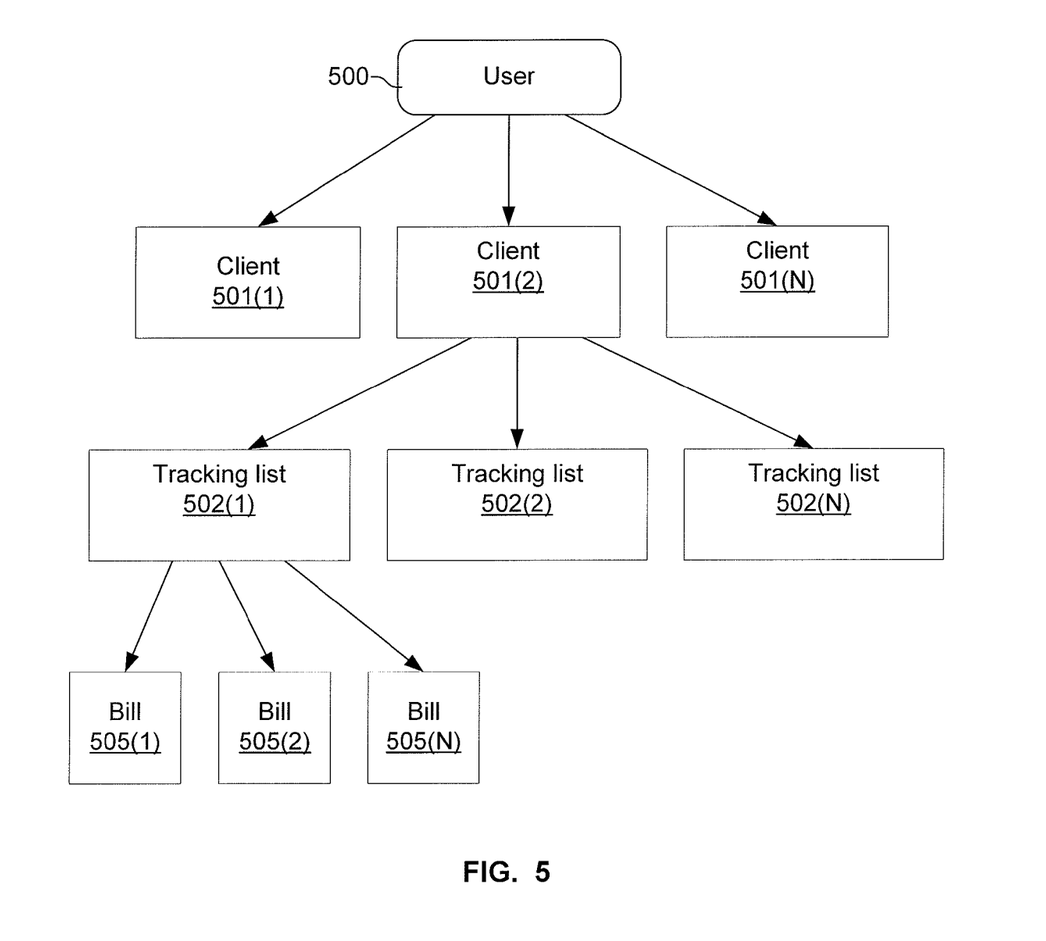
FIG. 5 is an exemplary diagram showing the relationship between clients, tracking lists, and bills.

FIG. 5 is an exemplary diagram showing the relationship between clients, tracking lists, and bills. The present system allows a user to create one or more 'clients' for whom specific searches and other information may be saved, where one or more 'tracking lists' may be created for each client. As shown in FIG. 5 (and as indicated by block 217 in FIG. 2), a user 500 first creates one or more clients 501(1)-501(N). Information relating to clients 501 is stored in the user data area 122 of database 120. The user may subsequently create one or more tracking lists 502(1)-502(N) for each client, e.g., client 501 (2) in the example of FIG. 5.

Each tracking list 502 may contain multiple bills and related information 505(1)-505(N), as described below with respect to FIG. 6B. Bills 505 stored in the database 120 are identified by a unique bill identifier. Each tracking list 502 holds a series of bill identifier numbers (assuming that there are multiple bills in a given list). A user can add or remove items from each tracking list 502 and rearrange the order of the bills in a given list.

An event tracking report 125, for each of a user's clients, showing the contents of each tracking list, may be viewed by clicking a "my client" icon on the system home page 114. Each event tracking report lists each of the bills 505 in the user's tracking lists 502, sorted in order of bill-related activity. A bill status icon, indicating the status of each bill 505 is displayed next to a description of the type of activity for each bill 505. Bill status is indicated as either 'filed', 'read', 'in committee', 'voted on', (action taken by) 'governor or the president', or 'withdrawn'.

Saving a Search

When search results are displayed, a user has several options, including saving the search results and tracking activity related to the search results. Saving the results of a search allows a user to be notified when new legislation is created that falls within the parameters of a user's original search.

Figure 6A:
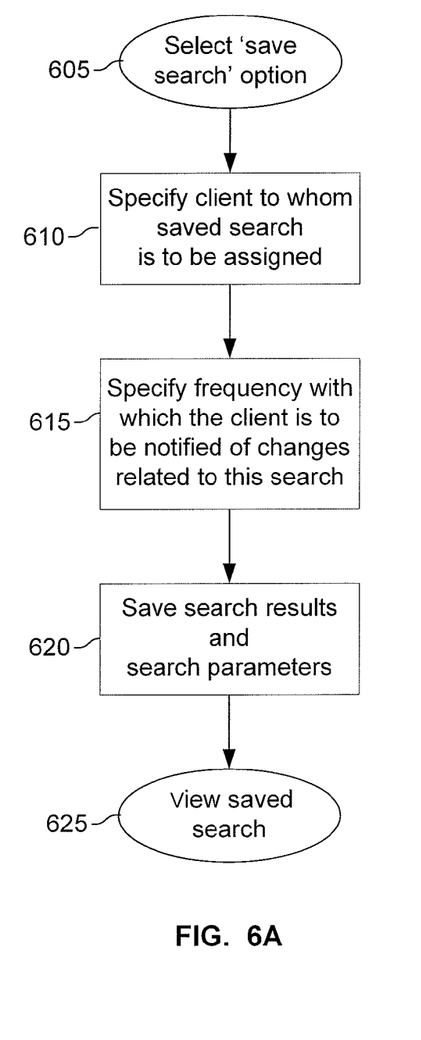
FIG. 6A is a flowchart showing an exemplary set of steps performed when the results of a search are saved.

FIG. 6A is a flowchart showing an exemplary set of steps performed when the results of a search are saved. To create a saved search, a user first initiates a search for a desired bill or other text. As shown in FIG. 5A, a "save search" icon on the home page 114 of system website 101 is then clicked, at step 605. Next, from a drop-down box, the client, to whom this saved search is to be assigned, is specified at step 610. At step 615, the user specifies the frequency with which the system should notify the client of changes related to this search. At step 620, the search results and search parameters are saved in the saved searches area 133 of database 120. To view saved searches at a later time, a "Saved Searches" button on the home page 114 is clicked on, at step 625.

Tracking a Search

Figure 6B:
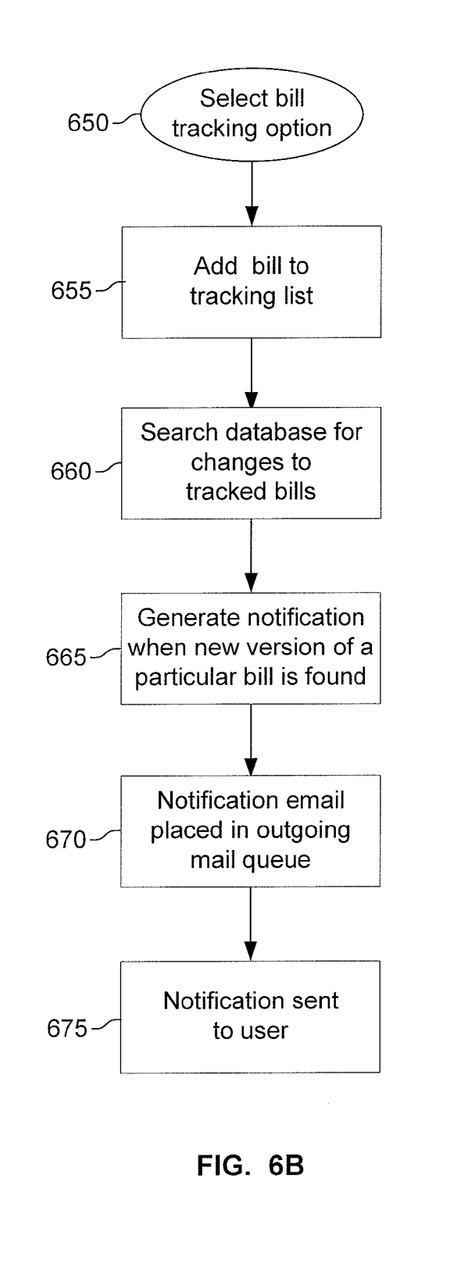
FIG. 6B is a flowchart showing an exemplary set of steps performed when the bill tracking option is selected.

FIG. 6B is a flowchart showing an exemplary set of steps performed when the bill tracking option is selected. The present system 100 includes a tracking system 180 that allows tracking of bill-related legislative activity by sending reports 125 in near-real-time to each user who has set up a tracking list 502. As shown in FIG. 6B, a user may flag a bill to be tracked by clicking on an 'add to tracking' icon displayed next to the bill, at step 650. The bill is then added to a tracking list 502, at step 655.

The present system 100 provides the capability for a user to flag bills 505 with an indicator of the user's particular stance or position (e.g., 'supported' or 'opposed') with respect to each bill. To flag bills in this manner, a user clicks on the tracking list 502 that contains the bill(s) for which a particular position is to be indicated. The user then clicks on a flag menu, displayed next to each of the desired bills, to select a color with which to mark the desired bill. Once marked, a bill will have an associated indicator in the selected color displayed anywhere that the bill is displayed as the user navigates through the system website 101.

At step 660, a notification script periodically searches through database 120 for changes to the tracked bills since the last notification was sent. At step 665, a notification 142 is generated, using data stored in per-client tracking reports 125, when the system 100 detects that a new version of a particular bill exists. Notifications are based on what each user is tracking and how often they chose to receive them. An email notification message indicating changes that occur to a bill which the user is tracking is placed in the outgoing email queue 103, at step 670, and the message is sent to the user at step 675. A notification frequency may be set for each tracking list 502. Notifications are sent via email so that they can be received on any internet-enabled computer or other internet-enabled device. A 'cron' scheduler 130 is employed to send notifications to users.

Report Generation

The present system 100 includes a reporting system 190 that allows users to generate custom-formatted reports 195 to be sent via email to one or more specified destination addresses. The reporting system 190 integrates with a user's tracking lists 502 and allows the user to create customized and personalized reports 195. Functionality is provided which allows users to create customized reports with unique templates and personalized letterheads directly in their web browser. The data for each report is placed in the outgoing mail queue 103. A scheduler 130 runs a script that checks the outgoing mail queue 103 and sends out a report 195 when necessary.

Figure 7:
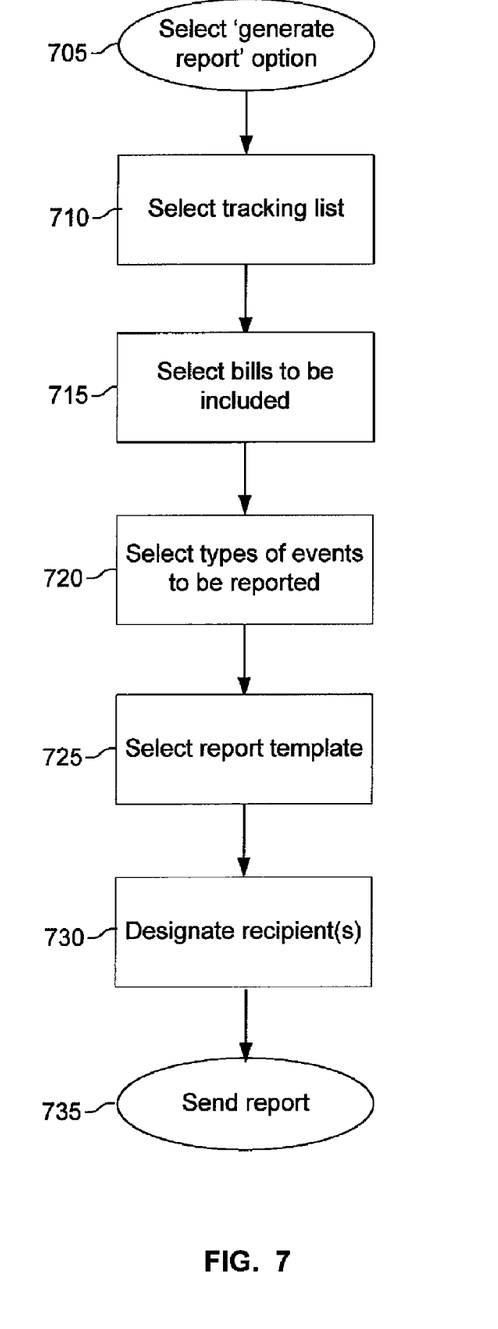
FIG. 7 is a flowchart showing an exemplary set of steps performed in reporting legislative information to system users.

FIG. 7 is a flowchart showing an exemplary set of steps performed in reporting legislative information to system users. As shown in FIG. 7, a customized report 195 is created by first clicking on a "generate report" icon on the system home page 114, at step 705. The tracking list 502 for which a report is to be created is then selected from a drop-down box, at step 710. The bills to be included in a user's report(s) are then selected, at step 715. Next, at step 720, the types of events to be displayed are selected.

In one embodiment, event types include past events and future events. Both types of events include all observed actions for each selected bill and past events include the prior three events for each selected bill. A report template may then be selected, at step 725, and comments may be added under each bill. The desired recipient email address(es) is/are then entered, at step 730, and a "send report" icon is clicked on to send the report 195 to the designated recipients, at step 735.

Movement Ranking

A system user may reorder search results based on 'bill movement', which assigns a weight or 'movement ranking' to selected bills. The movement ranking processes multiple variables, such as date of last legislative action and frequency of legislative actions. Movement ranking allows for queries to be sorted based on a methodology for determining their movement amount, which is defined as the number of bill-related actions in a fixed timeframe. The assumed notion is that bills that have received an above average amount of 'action' are likely to continue to receive an above-average number of actions. Bill-related 'action' includes actions or events such as movement of the bill between house and senate, amendments proposed or effected, committee actions on the bill, etc. Movement ranking determination may also include factors such as bill floor time, discussion time, and the number of actions the bill has received. This movement ranking method thus provides an indication of which bills receive the most attention and are the most important in the minds of legislators.

Figure 8:
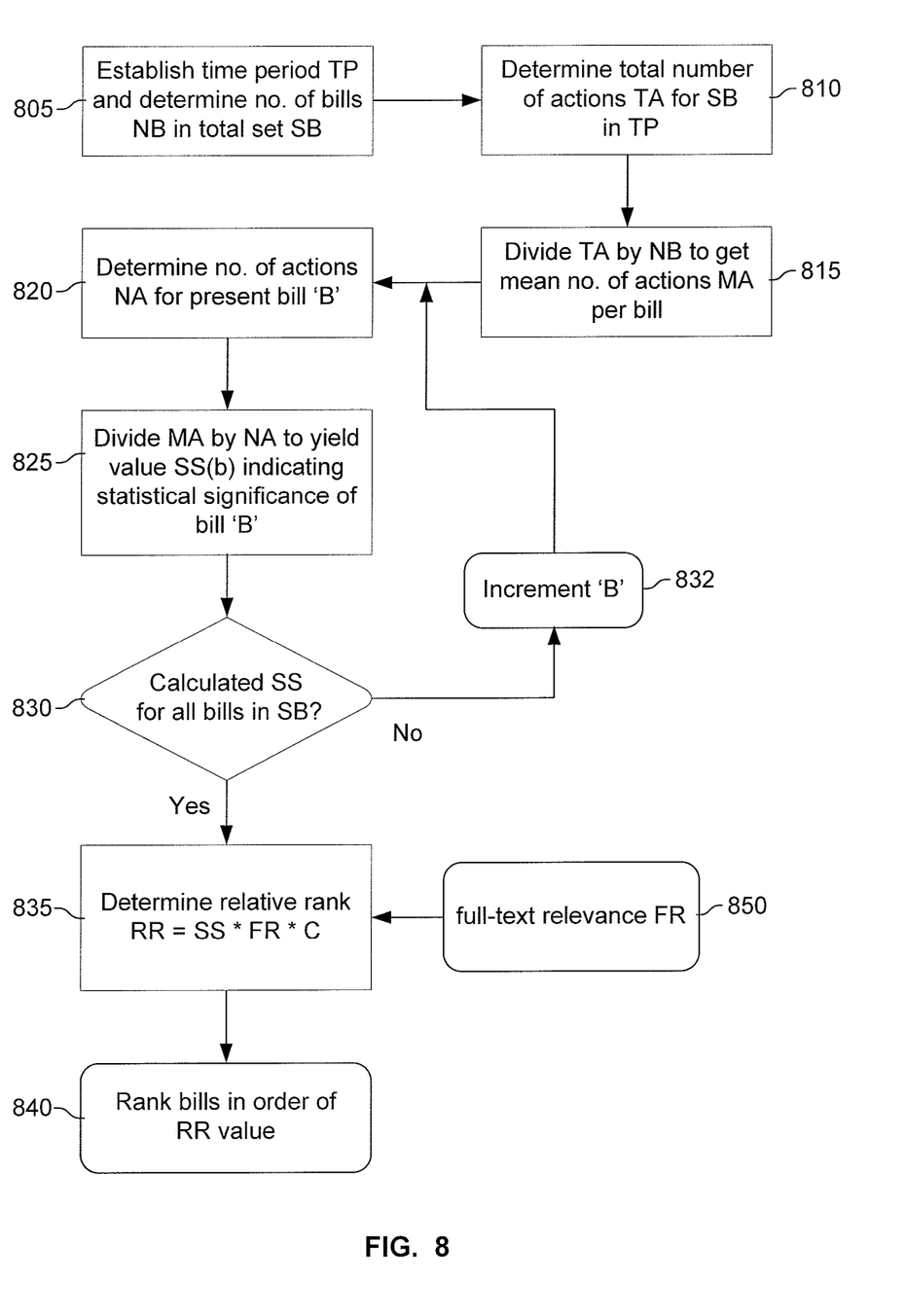
FIG. 8 is a flowchart showing an exemplary set of steps performed in determining movement ranking for a set of bills.

FIG. 8 is a flowchart showing an exemplary set of steps performed in determining movement ranking for a set of bills 500, using a movement ranking algorithm (included in the 'data analysis algorithms' 111 in FIG. 1). The relative statistical significance for each bill in the set is first determined, and each bill in the set of bills is then assigned a relative ranking to arrive at a numerical value which is then used to create the order of the bill results.

As shown in FIG. 8, at step 805, the total number of bills NB in the total relevant set of bills SB in a given timeframe TP is calculated. At step 810, the total number of actions TA for the total relevant set of bills SB in time period TP is determined. At step 815, the total number of actions TA is then divided by the total number of bills NB to get the mean, or average, number of actions MA per bill for the set of bills SB in time period TP.

The number of actions NA for the present bill 'B' in period TP is then determined, at step 820. At step 825, the mean number of actions MA is divided by the number of actions NA for the present bill in period TP, to yield a value SS(b) indicating the relative statistical significance of the present bill 'B'. Steps 820 and 825 are then repeated until a value for a value SS(b) has been determined for all of the bills in set SB, as indicated by loop 830/832/820/825.

At steps 835 and 840, the relative rank RR for each bill in set SB is determined by assigning a relative ranking to each bill in set SB according to the formula:

$$\text{relative\_rank } RR = \text{relative statistical significance } SS * \text{'full-text relevance' } FR * \text{constant } C$$

where 'full-text relevance' is a numerical value indicating the relevance of a specific row relative to other rows in the search result set, as provided by the database search engine, e.g., MYSQL. A value for the full-text relevance of a particular bill is provided, at step 850, by a full-text search program (one of algorithms 126) used to search the database 120. 'Full-text relevance' is a ranked relevance for the row containing the particular bill relative to all other rows in the search result set.

A 'browse by most active' function may be selected by a user to examine the entire pool of bills in database 120 and display a list of bills 505 sorted according to the movement ranking algorithm described below, where the bills are sorted according to the formula:

$$\text{relative statistical significance} * \text{result\_rank}.$$

System E-Mail Handling

Outgoing email is scheduled by a set of scripts that are executed via 'cron' schedulers 130. A mailer 141 handles both 'normal' outgoing email and 'newsletter' outgoing email. 'Normal' email is sent out without any content manipulation by the mailer. The 'normal' email queue is populated by the user sending a report, the notification system creating an email, etc.

The present system also includes a newsletter subsystem 140 that allows a user to send reports or announcements to one or more recipients. Newsletter email uses a separate 'news' mail queue 153 (apart from 'normal' email queue 103) and content manipulation. Each newsletter email is embedded with a tracking token. In one embodiment, links are rewritten to force redirection through a system website monitoring program to track 'clicks' from website users. The newsletter queue is populated by a system user creating a newsletter.

In an exemplary embodiment, the present system implements SMTP (Simple Mail Transfer Protocol), via SMTP Engine 104 (shown in FIG. 1), for transferring email messages. The SMTP protocol is commonly used (together with other protocols) by email programs such as Outlook, Pegasus Mail, etc. SMTP engine 104 queues and sends email directly to recipient mail servers. In all cases, the data for email to be sent out is placed in either mail queue 103 or in news queue 153.

Reminders

In order to apprise users of various features of the present system 100, the system provides predetermined 'reminders' about the existence of certain features. These are sent out periodically to any user who has not been using all of the systems features. Reminders describing basic system functionality are first sent to new users, and as time progresses, more complex features are included in the reminders. Using the reminder list 905 in database 120, a reminder is inserted into a reminders table 910 (shown in FIG. 1). Reminder email is generated by a 'cron' scheduler 130 running periodically.

Figure 9:
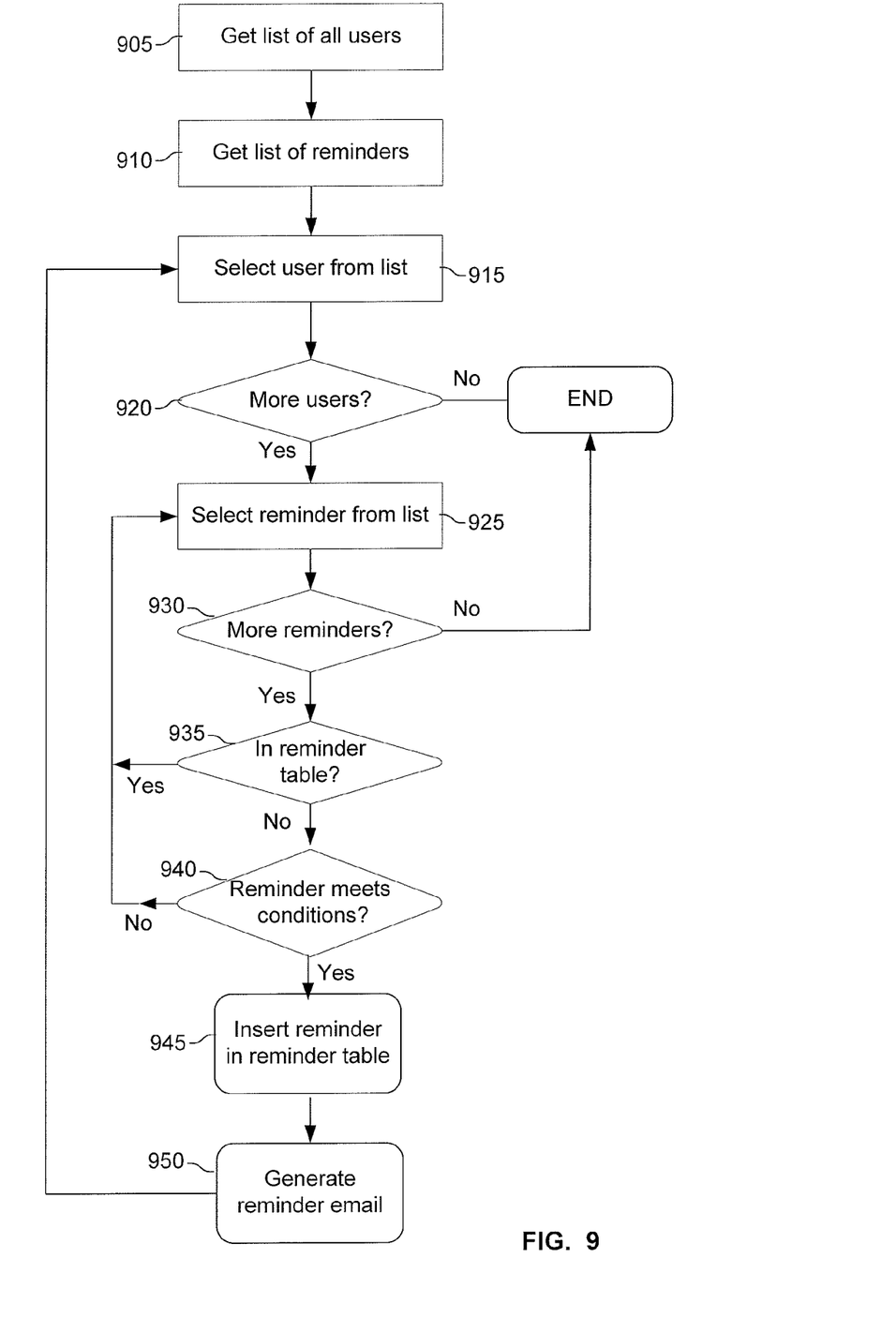
FIG. 9 is a flowchart showing an exemplary set of steps performed in generating system reminders.

FIG. 9 is a flowchart showing an exemplary set of steps performed in generating system reminders. As shown in FIG. 9, at steps 905 and 910, a list of the system users and a list of the reminder notices are obtained from database 120. A loop, consisting of steps 915 through 950 is then executed for each of the system users.

At step 925, if (at step 930) there are additional reminders not yet processed in the reminder list, a reminder is selected from the reminder list, and a reminder table, containing each of the presently-appropriate reminders for the present user, is then examined, at step 935 to determine whether the present reminder is already in the user's reminder table, and if not, a check is made, at step 940, to determine if the reminder meets predetermined criteria for being sent to the present user at this point in time. If so, the reminder is inserted in the reminder table, at step 945, and reminder email is generated for the present user, at step 950.

Event Calendar 127

The present system 100 also includes an event calendar 127 that aggregates data, using the parsing scripts 160, from a variety of sources and gives users the ability to enable/disable the display of some categories of events.

While preferred embodiments of the disclosed subject matter have been described, so as to enable one of skill in the art to practice the disclosed subject matter, the preceding description is intended to be exemplary only, and should not be used to limit the scope of the disclosure, which should be determined by reference to the following claims.

What is claimed is:

1. A method for managing legislative information comprising:
    collecting legislative information, including text comprising legislative bills, via an electronic search of at least one website;
    parsing the text into predefined categories;
    storing the text thus parsed in a database as parsed text;
    performing a search, using one of the predefined categories as search criteria, to select a subset of the bills meeting the search criteria;
    transmitting information, related to the subset of the bills, to a requesting entity via an electronic communication;
    comparing subsequent versions of the parsed text of each of the bills with an original version of the parsed text of each of the bills to determine activity of each of the bills;
    tracking the activity of the bills, wherein the activity is selected from activities, related to the bills, consisting of movement between house and senate, amendments proposed, amendments effected, and committee actions; and
    transmitting information, related to the activity, to the requesting entity via an electronic communication.

2. A method for managing legislative information comprising:
    collecting legislative information, including text comprising legislative bills, via an electronic search of at least one website;
    parsing the text into predefined categories;
    storing the text thus parsed in a database as parsed text;
    performing a search, using one of the predefined categories as search criteria, to select a subset of the bills meeting the search criteria; and
    transmitting information, related to the subset of the bills, to a requesting entity via an electronic communication;
    wherein the bills are ranked in an order determined in accordance with a formula comprising factors including:
    the total number of bills NB in the total relevant set of bills SB in a given timeframe TP;
    the total number of actions TA for the total relevant set of bills SB in time period TP;
    the mean number of actions MA per bill for the set of bills SB in time period TP, determined from the total number of actions TA divided by the total number of bills NB;
    the number of actions NA for the present bill 'B' in period TP;
    wherein the relative statistical significance of each bill SS(b) is determined by dividing the mean number of actions MA by the number of actions NA for the present bill in period TP, and
    wherein the relative rank RR for each bill in set SB is determined by assigning a relative ranking to each bill SS(b) according to the formula:

$$RR=SS(b)*\text{'full-text relevance'},$$

wherein 'full-text relevance' is a numerical value indicating relevance of a specific row relative to other rows in a search result set returned in a full-text search of the relevant set of bills SB.

3. A system for managing legislative information comprising:
    a database for storing the legislative information;
    a processing unit, coupled to the database, for processing information contained in the database;
    an Internet web server coupled to the database and to an Internet website; and
    at least one text parsing script;
    wherein the system:
        collects legislative information, including text comprising legislative bills, via an electronic search of at least one government website;
        parses the text into predefined categories using the parsing script;
        stores the text thus parsed in the database as parsed text;
        performs a search, using one of the predefined categories as search criteria, to select a subset of the bills meeting the search criteria;
        transmits information, related to the subset of the bills, via the web server, to a requesting entity using the website;
        compares subsequent versions of the parsed text of each of the bills with an original version of the parsed text of each of the bills to determine activity of each of the bills;
        tracks the activity of the bills, wherein the activity is selected from activities, related to the bills, consisting of movement between house and senate, amendments proposed, amendments effected, and committee actions; and
        transmits information related to the activity, via the web server, to the requesting entity using the website.

* * * * *